(12) United States Patent  
Roest

(10) Patent No.: US 6,710,928 B2  
(45) Date of Patent: Mar. 23, 2004

(54) HEAD-MOUNTED DISPLAY WITH A POLARIZATION-DEPENDENT MIRROR

(75) Inventor: Wouter Roest, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 228 days.

(21) Appl. No.: 09/821,133

(22) Filed: Mar. 29, 2001

(65) Prior Publication Data

US 2001/0028332 A1 Oct. 11, 2001

(30) Foreign Application Priority Data

Mar. 31, 2000 (EP) .............................................. 00201180

(51) Int. Cl.$^7$ .............................................. G02B 27/14
(52) U.S. Cl. ...................................... 359/633; 359/631
(58) Field of Search ................................. 359/630, 631, 359/633; 345/7, 8, 9

(56) References Cited

U.S. PATENT DOCUMENTS

| 4,163,542 | A | * | 8/1979 | La Russa | 359/15 |
| 5,715,023 | A |  | 2/1998 | Hoppe | 349/11 |
| 6,075,651 | A |  | 6/2000 | Hoppe | 359/641 |
| 6,271,969 | B1 | * | 8/2001 | Mertz | 359/618 |
| 6,400,493 | B1 | * | 6/2002 | Mertz et al. | 359/301 |
| 6,563,638 | B2 | * | 5/2003 | King et al. | 359/485 |

FOREIGN PATENT DOCUMENTS

EP  0718645 A2  6/1996  ............ G02B/5/30

* cited by examiner

*Primary Examiner*—Ricky Mack  
(74) *Attorney, Agent, or Firm*—Gregory L. Thorne

(57) ABSTRACT

The invention relates to a head-mounted display provided with an image display device and an optical system. The optical system comprises a first λ/4 plate, a lens element, a semi-transmissive mirror, a second λ/4 plate and a polarization-dependent mirror, arranged, in this order, from the incident side for projecting an image to be formed by the image display device on a user's retina.

10 Claims, 1 Drawing Sheet

HEAD-MOUNTED DISPLAY WITH A POLARIZATION-DEPENDENT MIRROR

Figure 1:
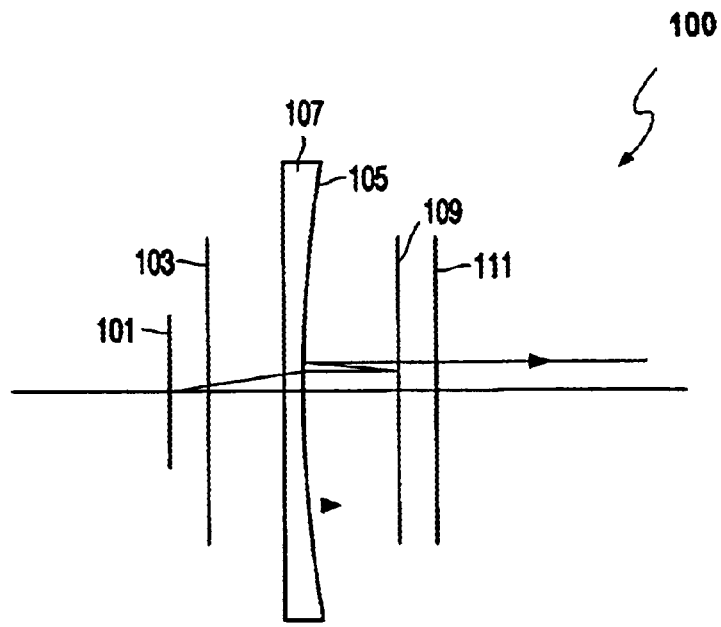

The invention relates to a head-mounted display provided with an image display device and an optical system comprising a semi-transmissive mirror, a lens element, a polarizing element and a λ/4 plate for combining light beams so as to project an image to be formed by the image display device on a user's retina.

A device of the type described above is known from European patent application EP 0 718 645. In a head-mounted display described in this document, an image is formed with a liquid crystalline image display panel, which image is projected by means of the optical system on the user's retina via the exit pupil of the head-mounted display. During use, the exit pupil coincides with an eye pupil of a user of the head-mounted display so that an image is formed on the user's retina. The head-mounted display may be worn by a user so as to display, for example, TV or video images or images which are associated with portable information and communication systems, computer games or computer simulations.

In the known head-mounted display, the optical system, viewed from the image display device, consecutively comprises a first λ/4 plate, a semi-transmissive mirror, a lens element and a polarization-dependent mirror. By partial reflection it is achieved that radiation of the image to be formed effectively passes the lens element three times. Furthermore, the first surface of the polarization-dependent mirror may be curved so as to reduce optical imaging errors. To obtain the polarization-dependent mirror, a polarization-dependent layer is then provided on the curved surface.

A drawback of the known head-mounted display is that the viewing angle at which a user observes the image is limited.

It is an object of the invention to provide a head-mounted display in which the viewing angle at which a user observes the image is increased. This object is achieved by the device according to the invention, as defined in claim 1. The advantage of this configuration is that the magnification is now mainly determined by the shape of the semi-transmissive mirror. Furthermore, a curved mirror may yield a higher magnification factor than is possible with the known combination of a flat mirror and a lens element. Moreover, the semi-transmissive mirror may have a semi-transparent layer which can be provided in a conventional and simple manner. A further advantage is that the polarization-dependent layer can be easily provided on a flat plate for the manufacture of the polarization-dependent mirror. Further advantageous embodiments are defined in the dependent claims.

A particular embodiment of the head-mounted display according to the invention is characterized in that an optical axis of the first λ/4 plate is transverse to an optical axis of the second λ/4 plate. This results in achromatic transmission suppression so that the contrast of the image is enhanced. This measure is known per se from the quoted European patent application EP 0 803 756.

A further embodiment of the head-mounted display according to the invention is characterized in that the polarization-dependent mirror is transmissive to a first direction of polarization of a linearly polarized light beam and is reflective to a second direction of polarization of the linearly polarized light beam, which direction of polarization is perpendicular to the first direction of polarization. An example of such a polarization-dependent mirror is a reflecting polarizing element such as, for example, Double Brightness Enhancement Foil as supplied by 3M.

A further embodiment of the head-mounted display according to the invention is characterized in that the lens element comprises a plano-concave lens element. For example, the concave surface of such a plano-concave lens is directed towards the second λ/4 plate. The concave surface of the semi-transmissive mirror makes a magnified virtual image of the image display device. Moreover, the use of a plano-concave lens results in a saving of the total weight of the head-mounted display, which is more comfortable for the user.

A further embodiment of the head-mounted display according to the invention is characterized in that the head-mounted display comprises an integrated optical element comprising the first λ/4 plate, the lens element and the semi-transmissive mirror. Integration of optical components in an optical element simplifies the assembly of the head-mounted display during production. The second λ/4 plate and the polarization-dependent mirror may also be integrated in a single optical element.

A further embodiment of the head-mounted display according to the invention is characterized in that the head-mounted display comprises at least an optical element which has an aspherical surface. The use of optical elements having aspherical surfaces reduces imaging errors such as coma, astigmatism and curvature of the field.

A further embodiment of the head-mounted display according to the invention is characterized in that the first and the second λ/4 plate are achromatic. The color errors in the images are reduced with such λ/4 plates.

A further embodiment of the head-mounted display according to the invention is characterized in that the second λ/4 plate and the polarization-dependent mirror have curved surfaces. Optionally, either the resolution may be enhanced or the magnification factor may be increased.

These and other aspects of the invention are apparent from and will be elucidated with reference to the embodiments described hereinafter.

Figure 2:
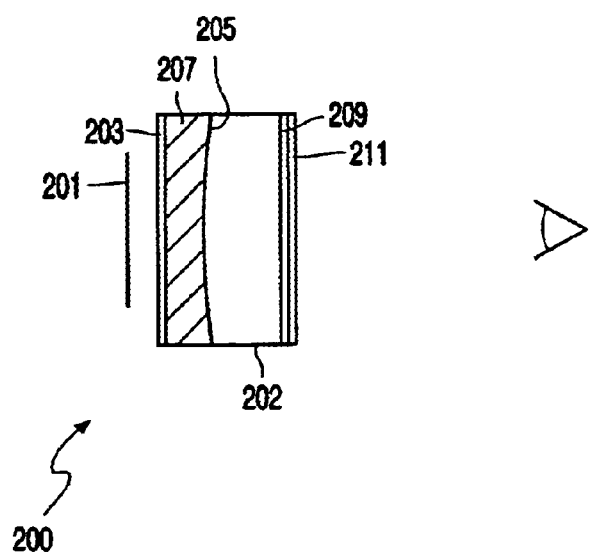

In the drawings:

FIG. 1 shows an embodiment of a head-mounted display according to the invention, and FIG. 2 shows an example of a head-mounted display in which a part of the optical system is integrated.

FIG. 1 shows a first embodiment of a head-mounted display 100 according to the invention. FIG. 1 only shows a segment of the head-mounted display, comprising an image display device, for example, a transmissive liquid crystalline image display panel 101 with an illumination unit (not shown) and an optical system. Viewed from the image display panel 101, the optical system consecutively comprises a first λ/4 plate 103, a plano-concave lens 107, a semi-transmissive mirror 105 which is provided on the concave surface of the plano-concave lens 107, a second λ/4 plate 109 and a polarization-dependent mirror 111. The concave surface of the plano-concave lens is directed towards the second λ/4 plate. The semi-transmissive mirror 105 is provided on the concave side of the plano-concave lens 107. The polarization-dependent mirror 111 comprises, for example, a reflective polaroid of the Double Brightness Enhancement Film (DBEF) type, as marketed by 3M™. The optical system projects an image to be formed by the transmissive liquid crystalline display panel 101 on the retina of a user's eye. FIG. 1 shows the radiation path of a pixel of the display panel. When the head-mounted display is operative, radiation of the image formed by the liquid crystalline display panel 101 will be incident on the first λ/4 plate 103. This first λ/4 plate 103 converts the radiation polarized in a first direction into a circularly polarized radiation, for example, a dextrorotatory polarized radiation which is incident on the semi-transmissive mirror 105 via the lens element 107. The semi-transmissive mirror 105 passes a part of the dextrorotatory polarized radiation to the second λ/4 plate 109. The second λ/4 plate 109 converts the dextrorotatory polarized radiation into radiation polarized in a second direction, which second direction of polarization is transverse to the first direction of polarization. The radiation polarized in the second direction is subsequently incident on the reflective polaroid 111. The reflective polaroid 111 reflects all of the radiation polarized in the second direction back towards the second λ/4 plate 109. Since the reflective polaroid 111 reflects all of the radiation polarized in the second direction, no further polarizer is required to enhance the contrast, as is the case in the known head-mounted display. The second λ/4 plate 109 converts the radiation polarized in the second direction into a dextrorotatory polarized radiation which is incident on the concave semi-transmissive mirror 105. The semi-transmissive mirror 105 reflects a part of the dextrorotatory polarized radiation to the second λ/4 plate 109 and changes the dextrorotatory polarization into a levorotatory polarization. The levorotatory polarized radiation is incident again on the second λ/4 plate 109 which converts the levorotatory polarized radiation into a radiation polarized in the first direction. The radiation polarized in the first direction is subsequently incident again on the reflective polaroid 111. However, the reflective polaroid 111 passes the radiation now polarized in the first direction to a user's eye (not shown). The optical axes of both the first and the second λ/4 plate extend at an angle of 45° to the first direction of polarization.

To obtain an achromatic transmission suppression for enhancing the contrast of the image, the λ/4 plates 103, 109 may be placed in such a way that the optical axis of the first λ/4 plate 103 is transverse to the optical axis of the second λ/4 plate 109. This arrangement of the optical axes of the first and the second λ/4 plate 103, 109 is known per se from the quoted European patent application EP 0 803 756.

Instead of a head-mounted display, in which the optical axis of the first λ/4 plate is transverse to the optical axis of the second λ/4 plate, an achromatic first λ/4 plate and an achromatic second λ/4 plate may be used alternatively, in which the direction of the optical axes encloses an angle of +45° to the first direction of polarization. Achromatic λ/4 plates are marketed by, for example, "Bernhard Halle Nachf. GmbH & Co".

A magnification of, for example, 150 times of an image display panel with a diameter of 1 inch and at an apparent distance of 3 m can be obtained with the concave surface of the plano-concave lens, resulting in a user viewing angle of 64°.

To reduce image errors such as coma, astigmatism and curvature of the field, a plurality of the curved surfaces of the optical elements in the above-described embodiments of the head-mounted display is preferably formed aspherically, for example, the curved surfaces of the semi-transmissive concave mirror 105.

To further simplify the assembly of the head-mounted display, a plurality of optical elements, for example, the first λ/4 plate, the lens element and the semi-transmissive mirror may be integrated in an optical element.

FIG. 2 shows an example of a segment 200 of a head-mounted display according to the invention, comprising an image display device, for example, a transmissive liquid crystalline display pane 201 and an vptical system. The optical system comprises an integrated optical component 202, a second ¼ plate 209 and a polarization-dependent mirror 211, in which, in this order, the first ¼ plate, the lens element 207 and the semi-transmissive mirror 205 are integrated along the optical axis of the optical system. The semi-transmissive mirror 205 is constituted by a semi-transparent metal layer which is provided on a concave surface of the first lens element 207, for example, a layer of aluminum. The first ¼ plate 203 comprises, for example, a ¼ foil which is provided on a first surface of the first lens element 207. Furthermore, the second ¼ plate 209 and the polarization-dependent mirror 211 may be integrated in a second integrated optical element for example, by providing a reflective polaroid of the type DBEF on the ¼ foil 209. The lens element 207 may be made of glass or polymethamethylacrylate (PMMA). When the head-mounted display is operative and is worn by the user, radiation of a pixel of the image formed by the liquid crystalline image display panel 201 will be incident on the first ¼ plate 203. The angle between the optical axis of the first ¼ place 203 and the first direction of polarization is, for example, +45°. The first ¼ plate 203 converts the radiation polarized in a first direction into a circularly polarized radiation, for example, a dextrorotatory polarized radiation which is incident on the semi-transmissive mirror 205 via the lens element 207. The semi-transmissive mirror 205 passes a part of the dextrorotatory polarized radiation to the ¼ foil 209. The optical axis of the ¼ foil 209 extends at an angle of −45° to the first direction of polarization and is thus transverse to the optical axis of the first ¼ plate 203. The ¼ foil 209 converts the dextrorotatory polarized radiation into a radiation polarized in a first direction. The radiation polarized in the first direction is subsequently incident on the reflective polaroid 211. The reflective polaroid 211 reflects all of the radiation polarized in the first direction back to the semi-transmissive mirror 205 via the ¼ foil 209. The ¼ foil 209 converts the radiation polarized in the first direction into a dextrorotatory polarized radiation which is incident on the concave semi-transmissive mirror 205. The semi-transmissive mirror 205 reflects a part of the dextrorotatory polarized radiation back to the ¼ foil 209 and changes dextrorotatory polarization into a levorotatory polarization. The ¼ foil 209 converts the levorotatory polarized radiation into a radiation polarized in the second direction, which second direction is transverse to the first direction of polarization. The radiation polarized in the second direction is subsequently incident again on the reflective polaroid 211. However, the reflective polaroid 211 passes the radiation now polarized in the second direction to a user's eye (not shown). Instead of a head-mounted display in which the optical axis of the first ¼ plate is transverse to the optical axis of the second ¼ plate, an achromatic first ¼ plate and an achromatic second ¼ plate may be alternatively used in this example, in which the direction of the optical axes encloses an angle of +45° to the first direction of polarization.

What is claimed is:

1. A head-mounted display provided with
   an image display device and
   an optical system comprising a semi-transmissive mirror, a lens element, a λ/4 plate and a polarizing optical element for combining light beams so as to project an image to be formed by the image display device on a user's retina, characterized in that the optical system comprises a second λ/4 plate and the polarizing optical element comprises a polarization-dependent mirror, in which, viewed from the image display device, the first λ/4 plate, the lens element, the semi-transmissive mirror, the second λ/4 plate and the polarization-dependent mirror are arranged one behind the other.

2. A head-mounted display as claimed in claim 1, characterized in that an optical axis of the first $\lambda/4$ plate is transverse to an optical axis of the second $\lambda/4$ plate.

3. A head-mounted display as claimed in claim 1, characterized in that the polarization-dependent mirror is transmissive to a first direction of polarization of a linearly polarized light beam and is reflective to a second direction of polarization of the linearly polarized light beam, which direction of polarization is perpendicular to the first direction of polarization.

4. A head-mounted display as claimed in claim 1, characterized in that the lens element comprises a plano-concave lens element.

5. A head-mounted display as claimed in claim 4, characterized in that the concave surface of the plano-concave lens element is directed towards the second $\lambda/4$ plate.

6. A head-mounted display as claimed in claim 1, characterized in that the head-mounted display comprises an integrated optical element comprising the first $\lambda/4$ plate, the lens element and the semi-transmissive mirror.

7. A head-mounted display as claimed in claim 1, characterized in that the second $\lambda/4$ plate and the polarization-dependent mirror are integrated.

8. A head-mounted display as claimed in claim 1, characterized in that the head-mounted display comprises at least an optical element which has an aspherical surface.

9. A head-mounted display as claimed in claim 1, characterized in that the first and the second $\lambda/4$ plate are achromatic.

10. A head-mounted display as claimed in claim 1, characterized in that the second $\lambda/4$ plate and the polarization-dependent mirror have curved surfaces.

* * * * *